United States Patent [19]
Himes et al.

[11] 3,873,281
[45] Mar. 25, 1975

[54] HIGH ENERGY GAS FILTRATION METHOD

[75] Inventors: Richard Carl Himes; Bruce Galvin Craig; Walter Field Gulick, all of Littleton, Colo.

[73] Assignee: Johns-Manville Corporation, Greenwood Village, Colo.

[22] Filed: Jan. 7, 1974

[21] Appl. No.: 431,462

[52] U.S. Cl............................ 55/96, 55/97, 55/242, 55/354, 55/522
[51] Int. Cl............................................. B01d 46/18
[58] Field of Search ......... 55/96, 97, 233, 242, 259, 55/290, 351–354, 522

[56] References Cited
UNITED STATES PATENTS

| | | | |
|---|---|---|---|
| 3,252,691 | 5/1966 | Getzin et al. | 55/242 |
| 3,308,610 | 3/1967 | Springer et al. | 55/522 |
| 3,745,748 | 7/1973 | Goldfield et al. | 55/97 |
| 3,763,631 | 10/1973 | Horn et al. | 55/96 |
| 3,807,146 | 4/1974 | Witkowski | 55/522 |

OTHER PUBLICATIONS
Washable Filter Foam–Dunlop In Filtration and Separation, July, August 1972, Vol. 9, No. 4, pp. 484.

*Primary Examiner*—Bernard Nozick
*Attorney, Agent, or Firm*—Robert M. Krone; James W. McClain

[57] ABSTRACT

A cleanable gas filtration system is described for removal of liquid and solid particulate matter from air or other gas streams. The system operates in the "high energy" region at gas velocities of 300 to 4,000 feet per minute and pressure drops across the filter medium of 7 to 60 inches of water. The system employs as its filter medium a reticulated elastomeric foam, such as a fully reticulated polyurethane foam, having a void fraction of at least 90%. Submicron and larger size particles can be filtered with high efficiency, and dry solid, liquid and mixed particulate matter can be readily handled.

24 Claims, 1 Drawing Figure

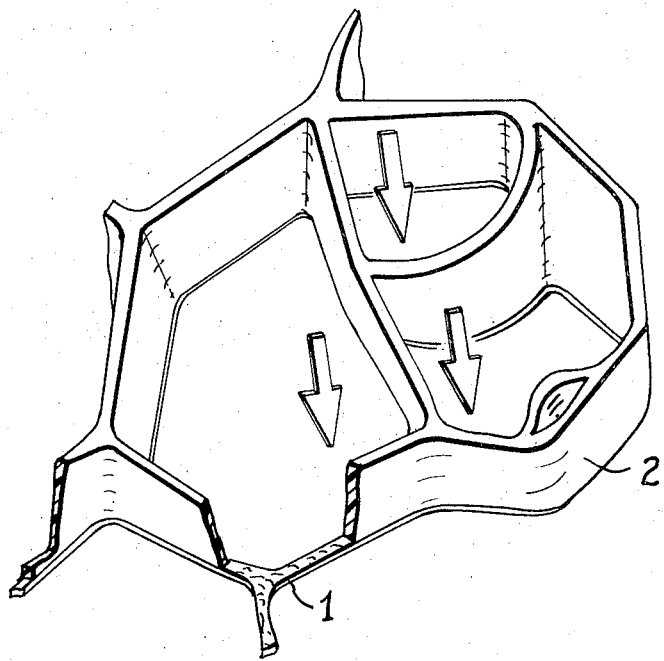

HIGH ENERGY GAS FILTRATION METHOD

BACKGROUND OF THE INVENTION

The invention herein relates to filtration systems for removing particulate matter from gas streams. More particularly, it relates to an improved system for removing micron and submicron sized liquid and solid particles from "high energy" gas streams.

As used herein, "high energy" gas streams refer to those gas streams having linear velocities at the filter medium face of from 300 to 4,000 feet per minute (fpm) and in which the pressure drops across the filter medium are of from about 7 to 60 inches of water.

Also as used herein, "gas" refers to air or other gaseous substances, including mixtures of gases effluents, as are found in stack effluents, exhaust streams, and the like, and is also used generally to include both pure or clean gas streams as well as those containing liquid and solid particulate matter; the specific meaning at any point will be evident from the context.

One "high energy" filtration system has been disclosed in U.S. Pat. No. 3,339,351 to Carmichael, et al. In this system liquid particles in a high energy gas stream are first coalesced in an "agglomerating filter" to a droplet size of at least 10 microns, then removed from the gas stream in a second stage separator such as a filter or cyclone. The agglomerating filter is a thin, dense mat having a void fraction of not more than 89%. The Carmichael, et al., system has two principal practical disadvantages: it does not have the capability of handling solid particles, especially dry solids, and it does not provide for removal of spent filter media from the system without disruption of the filtering function.

Recently there has been described in U.S. Pat. No. 3,745,748 to Goldfield, et al., a filtration system, utilizing glass fiber mats, which obtains very high efficiencies for particulate removal from high energy gas streams. Under high energy conditions the Goldfield, et al., glass fiber mat system, utilizing glass fibers of 1 to 10 $\mu$ diameter, consistently obtains filtration efficiencies of 80% or better, where efficiency is defined to mean the percent of the particulate matter originally present in the gas which is removed during filtration. It is pointed out in the Goldfield, et al., patent that the system there described operates in a manner which is to a significant extent contrary to a number of principles of air filtration theory which had previously been considered to be critical for successful filtration operation. Because of its high efficiency, compact structure and ability to handle large volumes of high energy gases, the Goldfield, et al., system has achieved considerable commercial success.

Field experience with the Goldfield, et al., system has, however, brought to light a significant limitation of that system. It has been found that under most typical field conditions, cleaning of the glass fiber filter medium for reuse cannot be satisfactorily achieved. In those instances where cleaning is at times possible, the durability of the glass fiber mats is such that they cannot be cleaned and reused more than once or twice before they become unsatisfactory for service. Consequently, the filter medium usually passes once through the filtration equipment, becomes loaded with the particulate matter being filtered, and is indexed out of the system to be discarded. This results in high costs of filter medium, particularly where each unit of glass fiber is rapidly loaded by particulate matter and the throughput of filter medium is consequently high, as well as requiring constant attention by the operator to replenish the used material. In addition, where the particulate matter itself has economic value (as in some metal recovery operations) that value is either lost with the discarding of the used filter medium or the particulate is recovered only at a substantial cost to separate it from the used filter medium.

Consequently, it would be highly advantageous to have a method wherein filtration of particulate matter from high energy gas streams could be obtained with the same degree of efficiency and relative compactness characterized by the Goldfield, et al., system, but which would permit simple cleaning and reuse of the filter medium as well as recovery of any significant metal or other particulate economic values present.

It is therefore an object of this invention to provide an efficient system for the removal of particulate matter from high energy air streams.

It is also an object of this invention to provide a filtration system using a filter medium which is readily amenable to cleaning and reuse.

It is also an object of this invention to provide a filtration system wherein the configuration of the filter medium can be readily varied to accommodate different filtration requirements, e.g., different particle size distributions.

It is further an object of this invention to provide a filtration system wherein economic values of the trapped particulate matter can be readily recovered.

It is further an object of this invention to provide a filter system that will efficiently remove solid, liquid and mixed particulate matter from gas streams.

BRIEF SUMMARY OF THE INVENTION

The invention herein is an improvement in a processing for filtering micron and submicron size liquid and solid particulate matter from a large volume high energy gas stream, in which the velocity of the gas stream at the upstream face of the filter medium is in the range of from 300 to 4,000 feet per minute and the pressure drop across the filter medium is in the range of from about 7 to 60 inches of water. The filter medium in this process is in the form of a movable, replaceable, porous, gas-pervious mat, a portion of which is moved or indexed into the gas stream, loaded with particulate matter, moved or indexed out of the gas stream and a fresh portion of filter medium moved or indexed into the gas stream to replace the spent portion, all without interrupting the filtering process or substantially impeding the gas stream flow. The improvement herein comprises utilizing as the movable, replaceable, porous, gas-pervious filter medium a mat comprising at least one layer of a flexible reticulated elastomeric foam, preferably a polyurethane foam, having a pore density of from 5 to 200 pores per inch and a void fraction of at least 90%, passing the particulate loaded filter medium into cleaning means wherein the loaded filter medium is subjected to treatment to remove the particulate matter therefrom, and returning the cleaned mat to the filtration unit for reuse therein. The improved process may include continuous cleaning of loaded filter medium and continuous return of cleaned filter medium to the filtration unit, or it may involve batch cleaning of large amounts of spent filter medium and then subsequent return of portions of cleaned medium to the system. The reticulated form filter medium may be in the form of a single thick mat of approximately uniform pore density, or it may be a layered structure containing a plurality of thin mats of foam, with different layers having different pore densities or degrees of reticulation. The cleaning operation may consist of any of a variety of cleaning steps, such as water or solvent washing, ultrasonic cleaning, or air blowing. The cleaning means may also contain means for recovering valuable particulate material or at least the valuable portions thereof.

BRIEF DESCRIPTION OF THE DRAWING

The single FIGURE of the drawing is a generalized perspective view, partially cut away, of a typical section of the elastomeric foam filter medium in the filtration system of this invention, showing the unique and unexpected manner in which the medium collects particulate matter.

DETAILED DESCRIPTION AND PREFERRED EMBODIMENTS

The invention herein is an improvement on the filtration system described in the aforesaid Goldfield, et al., patent. The Goldfield, et al., filtration system is described in detail in that patent, and therefore only the outlines of the system will be described herein; for the purpose of completeness, however, the full disclosure of U.S. Pat. No. 3,745,748 is herein incorporated by reference. The Goldfield, et al., system is designed to provide at least 80% removal efficiency, and in many cases at least 90% or 95% removal efficiency, of both liquid and solid particulate matter in the size range of micron and submicron diameters from high energy gas streams. It is particularly effective with liquid particles. It will be understood by those skilled in the art that "efficiency" is a function of particle size for any given filtration system, and that therefore efficiency will vary in a system with varying particle size distribution. However, a good filtration system will have high (though not necessarily unvarying) efficiencies over a wide range of particle size distributions.

High energy gas streams have linear velocities at the filter medium face of from 300 to 4,000 feet per minute. Under "high energy" conditions, filter media normally function with a pressure drop of between 7 and 60 inches of water across the filter media. As pointed out by Goldfield, et al., such high energy conditions constitute very severe operating conditions for filtration equipment. Conventional filtration systems, and common filter media, will often not be efficient under these conditions for particulate removal or reduction of visible particulate matter. Such conventional systems fail under high energy conditions for a variety of reasons, which may include the high throughput causing too rapid loading with particulate matter, the filter medium becoming unduly compressed and distorted by the force of the rapidly moving gas stream, or the fibers of the media being too coarse for effective particle capture by the capture mechanisms which dominate in the high energy regime. Because of the severity of the conditions in this type of process, many of the materials designated in the prior art are therefore not operable herein. Also, the designation in the prior art of a particular material as a "filter medium" is no indication of its suitability in a high energy system; only actual performance data can unequivocally establish its operability.

In the Goldfield, et al., patent the fiber glass mat is shown in the form of a long strip attached at each end to feed and take-up reels. The feed and take-up reels serve to move the filter medium through the housing in which actual filtration of the gas stream takes place. Movement of the filter medium may be continuous or imtermittent. Regardless of the nature of the movement, however, once a particular portion of the glass fiber filter medium has become loaded with particulate matter and has been indexed or otherwise moved out of the air stream, its practical useful life is essentially over, for it is usually considered unsuitable for cleaning and reuse except under special circumstances.

The improvement of this invention is a significant technical advance over the Goldfield, et al., system. Although this system uses some of the same apparatus as that described in the Goldfield, et al., patent, there are major exceptions, which include: (1) The filter medium utilized herein is a flexible reticulated elastomeric foam, which has high filtration efficiency in the high energy regime, and which has the significant ability to be cleaned and reused as well as the capability of being tailored to the optimum configuration. (2) The improved system herein contains means for cleaning the particulate matter from the heavily laden spent filter medium, and means for returning the cleaned medium to the filtration system. (3) The improved system herein may also contain means for recovering economic values from the particulate matter trapped by the filter medium.

The filter medium of the improved invention herein is a flexible reticulated elastomeric foam. This material is a three-dimensional network of interconnecting strands of a polymeric resin. The degree to which the foam will be reticulated (i.e., opened) will depend on the service conditions to be encountered and the design operating parameters. The more highly reticulated the foam, the lower will be the pressure drop across a given thickness of filter medium at a given flow rate. Therefore, the foam must have at least that degree of reticulation which will permit its use within the pressure drop limits of 7 to 60 inches of water defined above. The degree of reticulation can be defined in practice by the void fraction of the foam, i.e., the percentage of the foam volume which consists of void space rather than solid material. In the foams useful in the process of this invention, void fraction will be at least 90%, usually in the range of 90–99%, and preferably 95–99%. It is believed that the degree of reticulation will also affect the amount of loading that the filter medium can accommodate, with the more reticulated materials usually accepting higher loadings. Further, ease of cleaning is thought to be a factor of degree of reticulation, with again the more reticulated foams usually being more readily cleanable. It is therefore preferred in this invention that the more highly reticulated foams be used. Of particular preference are those referred to in the trade as "fully reticulated" foams. These are foams in which virtually all of the cell walls which can be removed in a practical commercial reticulation process have in fact been removed. Therefore, as used hereinafter, the term "fully reticulated" will mean that the degree of reticulation defined as "full" by industry practice. In some instances it may be desirable to use a foam with less than full reticulation, especially where extra mechanical strength is needed, as these materials are more rigid than the fully reticulated foams and less susceptible to compression forces of the gas streams.

In addition to the several significant structural differences, the system of this invention with its foam media also has been found to incorporate a number of unique and unexpected phenomena, not heretofore known in high energy gas filtration systems. Principal among these is the unique mode of filtration, which, as contrasted to prior art systems, results in significant particulate removal with unexpectedly low increase in pressure drop across the filter medium. In prior art systems, including those that utilize various types of filter media such as fiber glass, particulate matter is removed from the gas stream by entrapment between the strands, fibers, etc., of the filter medium. This results in a rapid build-up of particulate matter in the intersticies of the medium, referred to as "blinding," and a rapid increase in pressure drop across the medium, so that frequent replacement of the medium is required. In the present system, however, it has been found that particulate matter is trapped not in the intersticies of the medium, but rather as a "wall-like" build-up of accumulated particles upstream into the air flow from each rib or nexus of the foam. A typical structure is shown in the FIGURE. In this FIGURE the strand is indicated by 1 and the built-up particulate material "wall" by 2. Gas flow is generally in the direction indicated by the large arrow. This unique type of particulate collection mechanism yields several important results, not heretofore found in filtration systems:

(1) Individual layers of media have been found to accumulate more than 10 times their own mass in particulate material. This is substantially greater than the mass accumulation found in prior art systems, where the filter medium is saturated ("blinded") at much lower multiples of the weight of the medium. For instance, in a conventional system wherein the pressure drop is generally found to be on the order of 1 inch of water, as contrasted to a high energy system, a reticulated foam of the type described in the Volz patent discussed below was found to accept only a three-fold loading. (2) Unanticipated high efficiencies are found for very fine dusts. That is, the theoretical impaction parameters which are calculated for fine dusts suggest that significantly lower efficiencies of collection are to be expected than have been found experimentally in this system. (3) Theory also suggests that there should be a sharp cut-off in the curve of particle collection efficiency versus particle size. In other words, there is predicted a particle threshold size below which collection efficiency is significantly decreased. This, however, has not been found to be the case in this system. Rather it has been found that good efficiency levels are observed at quite small particle sizes, and that efficiency gradually decreases over a broad size range, rather than showing a sharp cut-off. (4) Another major and unexpected property found is an initial depression of the pressure drop across the filter, at constant face velocity of the gas stream, upon introduction of particulate matter into the gas stream. This initial depression, which persists for many minutes in the typical experiment, is wholly contrary to the normal performance of a filtration system, in which the pressure drop gradually and continuously increases. (5) Finally, and very importantly, because the collected particles build outward into the gas stream from each strand or nexus of the foam, obstruction of the air passages is significantly reduced.

The material from which the filter medium herein is made can be any elastomeric material which is capable of being foamed and then "dewindowed" (which term is defined below) to form a flexible reticulated foam of a suitable degree of reticulation. Elastomeric (or polymeric) materials which are suitable herein include the polyurethanes, polychloroprenes (e.g., "Neoprene" polymers; trademark of the duPont Co.), butadiene-acrylonitrile copolymers (the "nitrile" rubbers), and glycol-terephthalate polyesters of the type known as "Hytrel" polymers (trademark of the duPont Co.). The particular elastomer chosen will of course be in part dependent on the service involved, especially the type of gas stream and particulate material to be encountered, since some elastomers are much more resistant to elevated temperatures and to certain types of particulate materials and/or gases than are others. Elastomer selection will pose little problem to those skilled in the art, for the resistance properties of the various elastomers are well known.

The preferred flexible elastomeric reticulated foam is one composed of a polyurethane. More than one version of polyurethane foams suitable herein are available commercially. However, for the purposes solely of illustration herein, the "typical" suitable polyurethane foam will be described by reference to the foam disclosed in U.S. Pat. No. 3,171,820 to Volz. This material is one formed by the reaction of an organic polyisocyanate with a polyalkylene ether glycol, a polyalkylene ether amine produced by the reaction of alkylene oxide with polyamines, or a polyester produced by the reaction of polyhydric alcohol with polycarboxylic acid. The strands are integrally interconnected by thickened nexus at spaced-apart points so as to form the isotropic skeletal outline of a multitude of polyhedrons whose faces are polygonal, common to a polyhedron adjacent thereto, open and partially or substantially free from membraneous polyurethane resin, and the network itself is substantially free of permeatoidal degraded strands and nexus.

The polyurethane resin is formed by the reaction of a diisocyanate with a polyhydroxy material. The polyurethane foam is produced by generating carbon dioxide or another gas in the reaction mixture while converting a liquid form of the polyurethane resin to a solid form. The gas or vapor is ordinarily generated while the material to be formed is in the plastic state. The generation of this gas results in the formation of bubbles, approximately spherical in form. As these bubbles expand, cells are formed which have more or less definite geometric configurations. The optimum packing sphere is an arrangement in which each sphere is surrounded by twelve other spheres; and correspondingly it has been found that the cells formed by the expansion of gas bubbles to the point of contact, so as to produce the low density, open-cell cellular structures, generally are in the form of dodecahedrons, with pentagonal sides or faces. This is the general rule, although in any foamed mass will be found cells of varying geometry. At the intersection of the faces are heavier strands of material. Between the strands forming the cell faces or walls are very thin membrane-like films. Ordinarily a minor proportion of the faces rupture during foaming, so that some cells are interconnected. Such foam is referred to as "open-celled." The various materials used to form the polyurethane resins, as well as common method of forming the open-celled foam, are well known and are described in detail in the Volz patent.

A reticulated foam useful in the improvement of the present invention (exemplified herein by a polyurethane foam) is produced from the open-celled foam described above by a process known as "dewindowization." Dewindowization, as used herein, refers to the removal of membraneous elastomer from the faces of some or all cells throughout the structure, leaving a resulting skeletal network structure known as a partially or fully reticulated foam. Dewindowization may be accomplished in a number of ways, some of which are basically physical and some chemical; the Volz patent describes several.

The reticulated foam filter medium used in the present invention will be in the form of a long strip from a few inches to several feet wide, up to one or two inches in thickness, and on the order of up to several hundred feet in length. The width of the belt will be dependent on the volume of gas to be filtered and the size of the filtration unit used. Mats can run anywhere from six inches to eight feet in width, although in practice most will be of from two to six feet in width. This width provides a significant surface area for filtration while yet being of a size which may be readily handled without substantial problems of kinking and folding.

The thickness of the foam mat will be from about ¼ to about 3 inches, preferably from about ½ to 2 inches. Lesser thicknesses generally provide sufficient filtration efficiency only if the mat is of extremely fine porosity, but the use of very fine porosity leads to rapid plugging of the filter medium. On the other hand mats thicker than the range described contain additional bulk without providing a corresponding increase in filtration efficiency. This added bulk results in more difficult handling, greater power requirement for the filtration medium drive mechanism and more difficulty in cleaning the particulate matter from the spent filter medium.

The length of a given mat of reticulated foam will be dependent upon the particular installation in which the mat is being used, as well as whether or not cleaning and return of the filter medium is continuous or in a batch-type operation. In a continuous system, one single continuous belt of filter medium is used. The continuous belt passes through the filtration apparatus where each portion receives a loading of particulate matter. As the belt moves, the load portions are carried from the filtration apparatus to the cleaning means where the particulate matter is removed therefrom. The cleaned portions of the continuous belt then are fed back into the filtration apparatus for reuse. Movement of the belt may be continuous or intermittent, so that a given portion of the filter medium either passes through the filtration apparatus at a constant speed or moves in short increments around the continuous path from the filtration apparatus to the cleaning means and back again. In such a system, the length of the mat would be determined by the length of the path required for the mat to pass from the filter chamber through the cleaning device and back to the filtration apparatus. It is envisioned that with ordinary placement of the apparatus, belt length of from 25 to 300 feet, usually 50 to 200 feet, would be highly satisfactory.

In a batch-type system, the filter medium passes once through the filtration device where each portion is laden with dust or other particulate matter. The foam mat is then passed to a separate cleaning means where the particulate matter is removed therefrom. The cleaned medium is then stored for subsequent return to the filter apparatus. In this type of system, a single mat may be cleaned as an entire unit while another mat is being run through the filtration system. Alternatively, a mat may be fed directly from the filtration system to the cleaning system and then collected and stored for subsequent return to the filtration system after one or more other belts have been passed through the system. In this type of operation relatively short mats, of from 25 to 100 feet, are normally used to ease any handling problem.

It is preferred that the cleaning operation and return to the filtration system be a continuous operation rather than batch-type.

The reticulated foams of this invention can have degrees of pore density. Pore density is defined as the average number of surface pores per lineal inch of surface (abbreviated "ppi"). The lower the pore density, the coarser the filter medium. Pore density will range from about 5 to 200 pores per inch, preferably 20 to 125 pores per inch.

The cleaning system used herein will depend on the type of reticulated foam used as well as the type of particulate matter being collected. The least complicated system would comprise a chemical cleaning technique, usually a simple water or solvent wash of the load foam to wash the particulate matter into a collection reservoir. This type of system is highly satisfactory when the particulate matter being collected is water- or solvent-soluble and it does not adhere too tenaciously to the strands of foam. It is also quite effective for removal of many dusts, powders, and the like dry materials. The choice of the washing material must also take into consideration the effect of that material on the foam itself. Most of the polyurethane foams useful herein are not adversely affected by water, mild acids or bases and common cleaning solvents. Hydrocarbons, however, particularly aromatic hydrocarbons, cause varying degrees of swelling of the foam. Consequently, if a hydrocarbon is to be used as the cleaning medium, means must be provided to remove the hydrocarbon from the foam following cleaning to restore the foam to its original dimensions. The water or solvent washing process may also be supplemented by the presence of soaps, detergents and similar cleaning media. Again, polyurethane foam is generally resistant to such materials, although certain hydrocarbon-based materials may have a temporary adverse but reversible effect. Other elastomers will of course have different degrees of solvent resistance. The resistance of all these materials to various solvents and other cleaning chemicals is well known and need not be repeated here, for the man skilled in the art will be well aware of the various chemicals which may be advantageously used with each elastomer. It should also be noted that chemical attack of the foam is a function of temperature, and materials which have little or no adverse effect on the filter medium at room temperature may be highly detrimental at elevated temperatures. Consequently, it is preferred that the cleaning step be conducted at a temperature no greater than 125° F, and preferably on the order of about ambient temperature.

Where the particulate matter is a dry solid, it may be removed by physical techniques, such as the aforesaid water or solvent washing, ultrasonic cleaning, air blowing, or shaking of the filter medium. (It will be noted that water and solvent washing are classified as both physical and chemical cleaning techniques. This is because they may remove particulate matter both by dissolving it and by physically dislodging it from the mat. The type and concentration of solvent, the solubility of the particle, and the force of the solvent or water against the media during washing will all be factors in determining whether the cleaning technique is predominately "chemical" or "physical" or a mixture of significant contributions by both means.) Further, any of the physical and/or chemical techniques may be used in combination. Combination techniques are especially useful where the air or gas stream contains a mixture of different types of particles. For instance, ultrasonic baths containing detergent are especially useful for cleaning wetted or oily solids from the filter medium.

EXAMPLE 1 a. A 2-inch-thick layer of 45 ppi polyurethane foam was used to remove fine titania dust (MMPD, $0.3\mu$; $\sigma_g$, 2.7)*, carried at a concentration of 1 grain per cubic foot (grain/ft$^3$) in air moving at 2,000 fpm, with average efficiency of about 97.5% and average pressure drop of about 20 inches of water over a period of 5.5 minutes; and then was recleaned to essentially its original condition by brief flushing with tap water.

*$\sigma_g$ is a measure of the width or effective spread of the particle size distribution about the mass median particle diameter (MMPD). A value for $\sigma_g$ of 1 denotes a uniform particle size (monodisperse aerosol) while increasing values indicate increasingly broad distributions of particle sizes. The values of $\sigma_g$ of primary interest in this invention are in the range of 1–5.

b. A filter consisting of a 0.5 inch layer of 45 ppi foam and a 0.5 inch layer of 80 ppi foam under challenge from the same air stream gave an average efficiency of about 98.5% at an average pressure drop of about 18 inches over a 3-minute period and was similarly readily recleaned.

EXAMPLE 2 a. A 1-inch-thick layer of 80 ppi polyurethane foam was used to remove a mixture of dioctyl phthalate aerosol (MMPD, $1.7\mu$; $\sigma_g$, 2) and Arizona Road Dust (MMPD, $8\mu$; $\sigma_g$, 4), each at a concentration of 0.5 grains/ft$^3$ in air moving at 2,000 fpm with an average efficiency of 95% and an average pressure drop 23 inches of water over a 3-minute period. Water flushing removed essentially all the dust from the filter and sufficient dioctyl phthalate that the filter could be returned to service with essentially the same performance.

b. A filter consisting of single 0.25 inch layers of 45 ppi foam, 60 ppi foam, 80 ppi foam and 100 ppi foam, when exposed to the same challenge gave an average efficiency of over 90% with an average pressure drop of about 21 inches over a 5-minute period, and was similarly readily recleaned.

EXAMPLE 3

A filter consisting of single 0.25 inch layers of 20 ppi urethane foam, 30 ppi foam, 45 ppi foam, and 60 ppi foam was used to remove the Arizona Road Dust of Example 2, carried at a concentration of 1.6 grains/ft$^3$ in air moving at 2,000 fpm and containing also a water fog (about 15 grains/ft$^3$) with an average efficiency of over 99% and an average pressure drop of about 18 inches over a period of 10 minutes. The filter was readily cleaned by water flushing.

EXAMPLE 4 a. A filter consisting of a one-half-inch layer of 20 ppi foam, a one-quarter-inch layer of 30 ppi foam, a one-half-inch layer of 45 ppi foam, and a one-quarter-inch layer of 60 ppi foam was used to remove a mixture of fine silica dust (MMPD, $0.7\mu$; $\sigma_g$, 2) and dioctyl phthalate (MMPD, $1.7\mu$; $\sigma_g$ 2), each at a concentration of one-half grain/ft$^3$ in air moving at 2,000 fpm and containing also a water fog (about 15 grains/ft$^3$), with average efficiency of over 96% and with a pressure drop rising to a maximum of about 14 inches of water in a one-half-hour period. The filter was thoroughly cleaned with a solution of detergent in water.

b. A filter of the same configuration as described above was used to remove particulate from air laden as described above, but at a steady pressure drop of 20 inches of water, rather than at constant air velocity. Filtration efficiencies of 98% to 99% were observed throughout a 45-minute period in which air velocity decreased from 2,450 fpm to 1,850 fpm.

What is claimed is:

1. In a process for filtering micron and submicron size liquid and solid particulate matter from a gas stream by means of a filter medium; wherein the velocity of said gas stream at the upstream face of said filter medium is in the range of from 300 to 4,000 feet per minute and the pressure drop across said filter medium is in the range of from 7 to 60 inches of water; and wherein said filter medium is in the form of a movable, replaceable, porous, gas-pervious mat; a portion of said mat being moved into the gas stream; loaded with particulate matter, moved out of the gas stream and a fresh portion of said mat being moved into said gas stream to replace the spent portion, all without interrupting the filtering process; the improvement which comprises:

a. utilizing as said filter medium a mat comprising at least one layer of a flexible reticulated elastomeric foam having a void fraction of at least 90%;

b. passing spent filter medium into cleaning means and therein removing trapped particulate matter from said filter medium; and c. thereafter returning the cleaned filter medium to a position in said gas stream for reuse therein.

2. The improved process of claim 1 wherein said elastomeric foam is a polychloroprene foam.

3. The improved process of claim 1 wherein said elastomeric foam is a butadiene-acrylonitrile copolymer foam.

4. The improved process of claim 1 wherein said elastomeric foam is a glycol-phthalate polyester foam.

5. The improved process of claim 1 wherein said cleaning means comprises a combination of physical and chemical techniques.

6. The improved process of claim 1 wherein the cleaning and return of said filter medium is continuous.

7. The improved process of claim 1 wherein the cleaning and return of said filter medium is conducted in a batch-type operation.

8. The improved process of claim 1 wherein said elastomeric foam has a pore density of from 5 to 200 pores per inch.

9. The improved process of claim 8 wherein said elastomeric foam has a pore density of from 20 to 125 pores per inch.

10. The improved process of claim 1 wherein said elastomeric foam has a void fraction in the range of 90% to 99%.

11. The improved process of claim 10 wherein said elastomeric foam has a void fraction in the range of 95% to 99%.

12. The improved process of claim 1 wherein said elastomeric foam is a polyurethane foam.

13. The improved process of claim 12 wherein said polyurethane foam has a pore density of 5 to 200 pores per inch.

14. The improved process of claim 13 wherein said polyurethane foam has a pore density of 20 to 125 pores per inch.

15. The improved process of claim 12 wherein said polyurethane foam is fully reticulated.

16. The improved process of claim 15 wherein said polyurethane foam has a void fraction in the range of 90% to 99%.

17. The improved process of claim 16 wherein said polyurethane foam has a void fraction in the range of 95% to 99%.

18. The improved process of claim 1 wherein said cleaning means comprises a chemical cleaning technique.

19. The improved process of claim 18 wherein said cleaning means comprises a solvent wash.

20. The improved process of claim 18 wherein said cleaning means comprises a water wash.

21. The improved process of claim 20 wherein said water wash also contains a soap or detergent.

22. The improved process of claim 1 wherein said cleaning means comprises a physical cleaning technique.

23. The improved process of claim 22 wherein said physical cleaning technique comprises ultrasonic cleaning.

24. The improved process of claim 23 wherein said ultrasonic cleaning means comprises an ultrasonic bath containing detergent.

* * * * *